United States Patent
Guichard et al.

(10) Patent No.: US 8,098,663 B2
(45) Date of Patent: Jan. 17, 2012

(54) CARRIER'S CARRIER WITHOUT CUSTOMER-EDGE-TO-CUSTOMER-EDGE BORDER GATEWAY PROTOCOL

(75) Inventors: Jim Guichard, New Boston, NH (US); Bruce S. Davie, Cambridge, MA (US); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 12/169,062

(22) Filed: Jul. 8, 2008

(65) Prior Publication Data

US 2010/0008361 A1    Jan. 14, 2010

(51) Int. Cl.
*H04L 12/28* (2006.01)
(52) U.S. Cl. .................. 370/392; 370/401
(58) Field of Classification Search .......... 370/392, 370/401
See application file for complete search history.

(56) References Cited

U.S. PATENT DOCUMENTS

| | | | |
|---|---|---|---|
| 6,463,061 B1 * | 10/2002 | Rekhter et al. | 370/392 |
| 6,526,056 B1 * | 2/2003 | Rekhter et al. | 370/392 |
| 7,075,933 B2 * | 7/2006 | Aysan | 370/395.31 |
| 7,136,374 B1 * | 11/2006 | Kompella | 370/352 |
| 7,420,958 B1 * | 9/2008 | Marques | 370/351 |
| 7,450,505 B2 * | 11/2008 | Buchanan et al. | 370/231 |
| 7,467,215 B2 * | 12/2008 | Ould-Brahim | 709/230 |
| 7,480,253 B1 * | 1/2009 | Allan | 370/252 |
| 7,564,802 B2 * | 7/2009 | Andrapalliyal et al. | 370/254 |
| 7,568,047 B1 * | 7/2009 | Aysan et al. | 709/238 |
| 7,593,352 B2 * | 9/2009 | Verma | 370/255 |
| 7,796,607 B2 * | 9/2010 | Gerber et al. | 370/395.31 |
| 2002/0181477 A1 * | 12/2002 | Mo et al. | 370/401 |
| 2004/0223499 A1 * | 11/2004 | Sanderson et al. | 370/395.52 |
| 2004/0223500 A1 * | 11/2004 | Sanderson et al. | 370/395.53 |
| 2004/0255028 A1 * | 12/2004 | Chu et al. | 709/227 |
| 2005/0286441 A1 * | 12/2005 | Huang | 370/254 |
| 2006/0092976 A1 * | 5/2006 | Lakshman et al. | 370/469 |
| 2007/0019676 A1 * | 1/2007 | Kompella | 370/468 |
| 2008/0170573 A1 * | 7/2008 | Ould-Brahim | 370/392 |
| 2008/0170578 A1 * | 7/2008 | Ould-Brahim | 370/401 |

OTHER PUBLICATIONS

Carrier-of-Carriers VPN, 1999, USA, Juniper Networks.*

* cited by examiner

*Primary Examiner* — Chirag G Shah
*Assistant Examiner* — Jay P Patel
(74) *Attorney, Agent, or Firm* — P. Su

(57) ABSTRACT

According to one aspect of the present invention, a method includes obtaining a first advertisement at a first provider edge (PE) device from a first customer edge (CE) device that is associated with a virtual private network, and sending a second advertisement on a control plane path associated with a border gateway protocol after obtaining the first advertisement. The first PE device has a routing and forwarding table. The first advertisement identifies a plurality of local routes associated with the first VPN, and includes a first indication that information relating to the plurality of local routes is not to be stored in the routing and forwarding table. The second advertisement identifies the local routes, an address of the first CE device, and the first CE device as a next hop.

23 Claims, 5 Drawing Sheets

CARRIER'S CARRIER WITHOUT CUSTOMER-EDGE-TO-CUSTOMER-EDGE BORDER GATEWAY PROTOCOL

BACKGROUND OF THE INVENTION

The present invention relates generally to networks. More particularly, the present invention relates to the deployment of a carrier's carrier (CsC) substantially without directly exchanging customer routes, or advertising next hops, between customer edges (CEs).

A virtual private network (VPN) created using multiprotocol label switching (MPLS) generally allows CEs, which may be routers, to communicate with a provider edge (PE), which may also be a router. A CE is typically located at the edge of a customer network, and is in communication with a PE of a service provider of an MPLS network. Customer routes between the CE and the PE are generally stored in a VPN routing and forwarding table (VRF) of the PE. The storage of all customer routes associated with a CE into a VRF of a PE allows the PE to locate a suitable route over which to route a received packet to a customer. However, the storage of all customer routes associated with a CE into a VRF is resource-consuming, particularly when a CE has a relatively large number of associated customer routes. Storing customer routes in VRFs is relatively expensive, and may utilize significant system resources, e.g., consume a relatively large amount of the memory space in the VRF.

A CsC architecture allows for the direct exchange of customer routing states between CEs. That is, a CsC architecture allows routes to be exchanged directly between customers, and also advertises routes with labels so as to create label switched paths (LSPs) to next hops. In a CsC architecture, a customer builds a mesh of CE-to-CE border gateway protocol (BGP) sessions that carry or otherwise propagate customer routes between the CEs and therefore the CE need only communicate the routes used as next-hops for these directly exchanged routes to the PE. As will be understood by those skilled in the art, building BGP sessions may be relatively expensive in terms of operational complexity for the provider of the CsC service.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF EXAMPLE EMBODIMENTS

General Overview

Figure 1A:
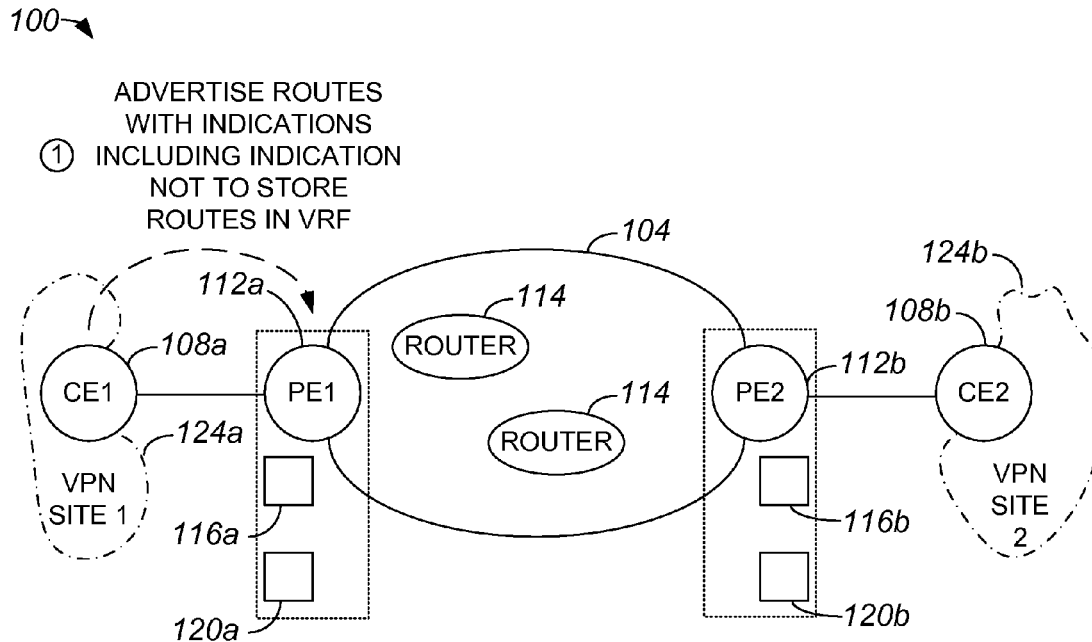
FIG. 1A is a diagrammatic representation of a network in which provider edges (PE) may forward packets without inserting routes into routing tables at a time t1 in accordance with an embodiment of the present invention.

In one embodiment, a method includes obtaining a first advertisement at a first provider edge (PE) device from a first customer edge (CE) device that is associated with a virtual private network (VPN), and sending a second advertisement on a control plane path associated with a border gateway protocol after obtaining the first advertisement. The first PE device has a specific routing and forwarding table for the VPN. The first advertisement identifies a plurality of local routes associated with the first VPN, and includes a first indication that information relating to the plurality of local routes is not to be stored in the VPN-specific routing and forwarding table. The second advertisement identifies the local routes, an address of the first CE device, and the first CE device as a next hop.

Description

A customer edge (CE), e.g., a CE device such as an Internet Protocol (IP) router, associated with a customer site provides a customer with access to a service provider network. In general, a CE gains access to a service provider network over a data link or connection to a provider edge (PE), e.g., a PE device such as a router. A CE establishes an adjacency with a PE to which it is substantially directly connected, and advertises local virtual private network (VPN) routes associated with the customer site to the PE. That is, a CE exchanges customer-specific routes locally with a service provider network through a PE of the service provider network.

Within an overall network that uses a Carrier's Carrier (CsC) architecture, traffic may be sent from one CE to another CE through a service provider network on a label switched path (LSP) over a backbone of the service provider network. Hence, PEs need not store all of the customers' routes in virtual routing and forwarding tables (VRFs), and are instead aware of substantially only the addresses of the CEs themselves. As will be appreciated by those skilled in the art, the CEs are typically LSP endpoints. By establishing an LSP substantially between CEs through the use of a CsC architecture, then advertising customer routes directly between CEs, the amount of information that is stored in a VRF of the locally attached PE is reduced. Conventionally, the CsC architecture involves the exchange of customer routes among the CEs using a border gateway protocol (BGP), either with direct CE-to-CE BGP sessions, or using BGP route reflectors with which the CEs exchange routes.

The CsC architecture may be enhanced through the advertisement of customer routes to locally attached PEs such that the customer routes are effectively marked to indicate that these routes need not be stored in the routing and forwarding tables of the PEs. In this way, information relating to the customer routes may be obtained by the PEs substantially without the need for storing the customer routes in VRFs of the PEs. Therefore, as in a CsC architecture, the need for a PE to store substantially all local VPN routes associated with a CE into a VPN routing and forwarding table (VRF) is substantially eliminated. As a CsC architecture typically does not require customer route information to be stored in a VRF, not storing all customer routes associated with a customer site does not significantly affect the CsC architecture. Furthermore, by transmitting the customer routes to the PEs, which are then able to redistribute the customer routes to other PEs and then to other CEs, the need for direct CE-CE exchange of customer routes is substantially eliminated.

In one embodiment, an LSP is established between CEs, e.g., CE routers, using a CsC architecture. However, unlike a conventional CsC architecture, the customer routes are not exchanged substantially directly between the CEs. Instead, customer routes may be advertised to a PE that is local to an originating CE, e.g., the CE associated with the customer routes. To allow customer routes to be advertised by a CE to a PE without being stored in the routing and forwarding tables of the PE, BGP speakers associated with the CE and the PE may include relatively specialized functionality.

In one embodiment, a BGP speaker associated with a PE is arranged to receive routes from a CE, and not to install routes selected as a best path into a routing or forwarding table such as a VRF. In such an embodiment, the BGP speaker may be arranged to install substantially only the real next-hops of routes selected as a best path, and to advertise routes that it has not stored or otherwise installed into a VRF. The BGP speaker associated with a PE may be arranged to advertise uninstalled routes, i.e., routes which have not been stored into a routing and/or forwarding table such as a VRF, after first effectively confirming that the original next-hop is available in the routing and/or forwarding table. That is, the BGP speaker associated with a PE may advertise uninstalled routes if the associated originator next-hop, namely the CE from which the PE received the routes, is installed in the routing and/or forwarding table of the PE. Further, the BGP speaker may be configured to advertise the next-hop prefixes of an originator next-hop with associated labels.

Figure 1B:
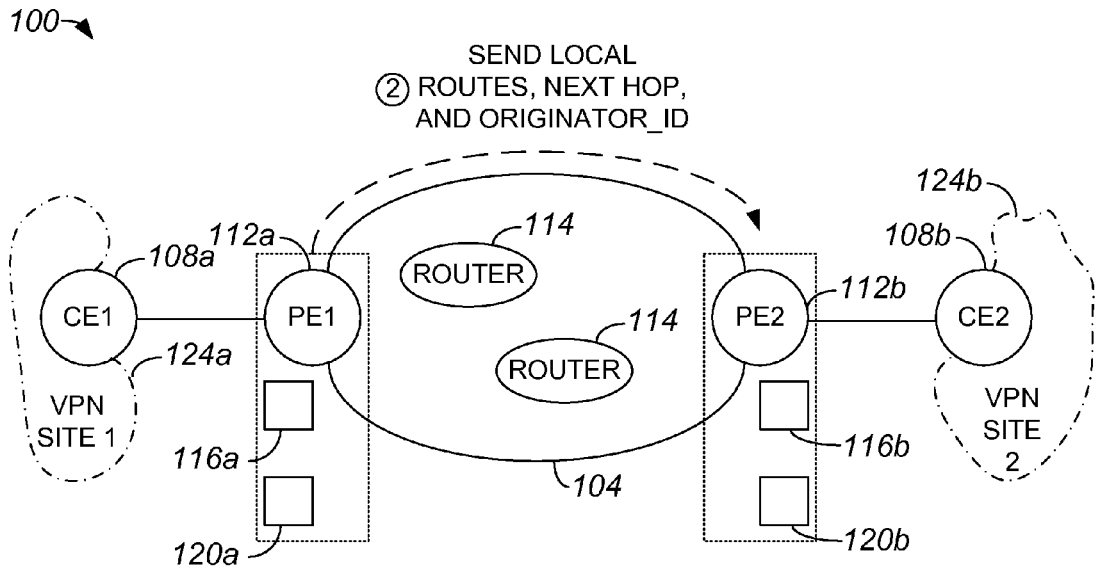
FIG. 1B is a diagrammatic representation of a network in which provider edges (PE) may forward packets without inserting routes into routing and forwarding tables at a time t2 in accordance with an embodiment of the present invention.
Figure 1C:
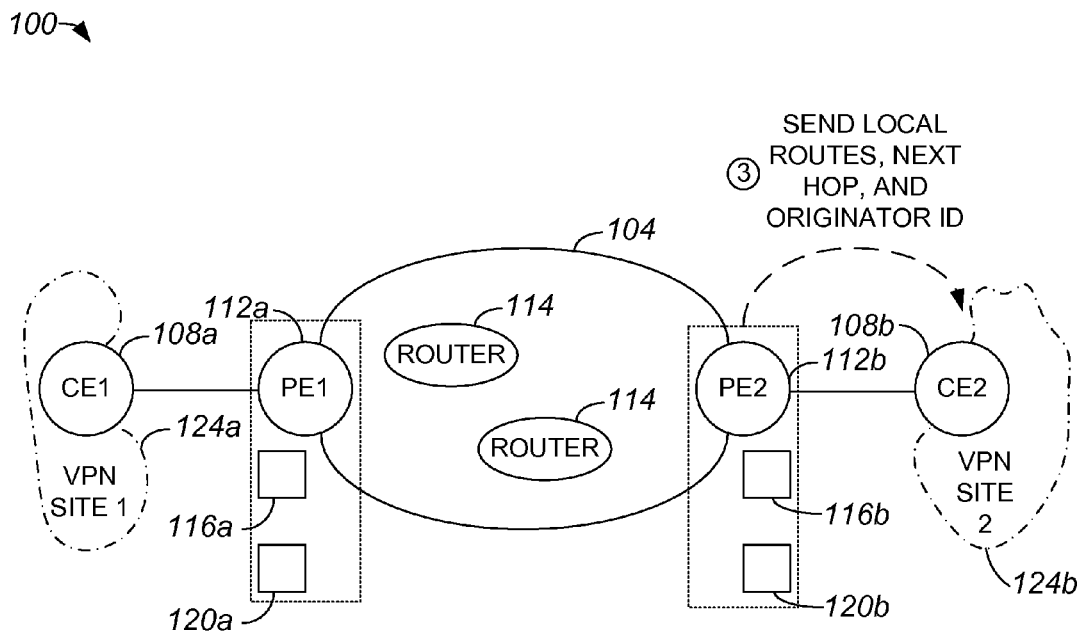
FIG. 1C is a diagrammatic representation of a network in which provider edges (PE) may forward packets without inserting routes into routing and forwarding tables at a time t3 in accordance with an embodiment of the present invention.

Referring initially to FIGS. 1A-1C, an overall network in which a PE may forward traffic without inserting routes associated with a CE into a routing and/or forwarding table will generally be described in accordance with an embodiment of the present invention. FIG. 1A is a representation of an overall network 100 at a time t1 when a first CE, i.e., CE1 108a, advertises routes to a first PE, i.e., PE1 112a. As shown, CE1 108a is associated with a first VPN site 124a, while a second CE 108b is associated with a second VPN site 124b. Both VPN site '1' 124a and VPN site '2' 124b are associated with the same VPN. PE1 112a, as well as a second PE 112b are a part of a service provider network 104 with which CE1 108a and CE2 108b may establish communications. Typically, in addition to PE1 112a and PE2 112b, provider network 104 may include other devices such as routers 114.

CE1 124a may advertise substantially all routes associated with VPN Site '1' 124a to PE1 112a, along with an indication that PE1 112a is not to store all the routes in a VRF 116a associated with PE1. Such an advertisement may also include a variety of other indications including, but not limited to including, an indication that the CE next-hop is to be maintained from advertised routes across the core of provider network 104, and an indication that labels are not to be assigned to prefixes associated with the routes. The indications included with such an advertisement may be provided by marking the routes with a specific attribute.

Rather than storing substantially all routes, e.g., customer routes, advertised by CE1 108a into VRF 116a, PE1 112a may store the routes in a memory 120a that is associated with PE1 112a. At a time t2 after PE1 112a receives an advertisement of routes from CE1 108a, PE1 112a effectively advertises or otherwise sends information pertaining to local routes, a next hop, and an originator_ID to PE2 112b, as shown in FIG. 1B. PE1 112a, which is a local PE, advertises the routes provided by CE1 108a with a next-hop set to identify CE1 108a, which is the originator or original CE. The address of CE1 108a may be specified by an originator_ID. It should be appreciated, however, that the address of CE1 108a may be specified by substantially any attribute, and is not limited to being specified by an originator_ID. An originator_ID typically provides information regarding an original next-hop such that a remote CE is able to identify an appropriate LSP over which traffic may be sent when advertised prefixes are to be reached.

FIG. 1C shows network 100 at a time t3 after PE2 112b receives an advertisement from PE1 112a. PE2 112b does not store the received routes in an associated VRF 116b, but may store the received routes in an associated memory 120b. PE2 112b also advertises or otherwise sends the received routes, along with the next-hop and originator_ID received from PE2 112a, to relevant local CEs such as CE2 108b. The next-hop is specified as PE2 112b as in conventional BGP operation, but the originator_ID is the address of CE1 108a.

In general, CE devices and PE devices includes hardware and/or software logic that is operable to, or otherwise provides functionality to, support CsC deployment substantially without creating CE-to-CE BGP sessions. A CE device that is part of a VPN may be configured to indicate to PE devices that the PE devices are not to store substantially all reachable routes associated with the CE device. A PE device may be configured to receive an advertisement from a CE device, and refrain from storing substantially all reachable routes associated with the CE device into a routing and forwarding table.

Figure 2A:
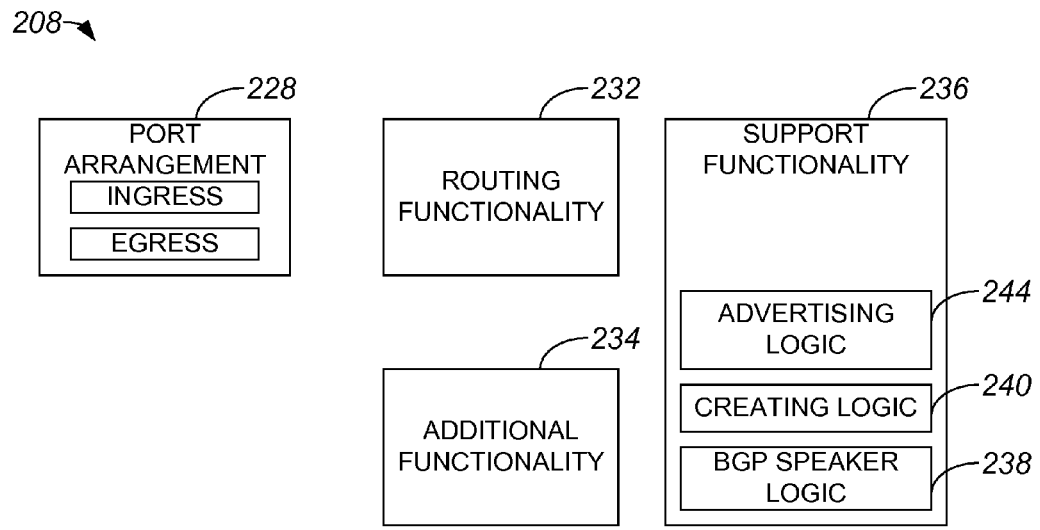
FIG. 2A is a block diagram representation of a CE in accordance with an embodiment of the present invention.

FIG. 2A is a block diagram representation of a suitable CE device in accordance with an embodiment of the present invention. A CE 208 includes a port arrangement 228 that provides egress and ingress capabilities. Port arrangement 228 allows CE 208 to establish communications with devices including, but not limited to including, a PE (not shown) associated with a provider network (not shown) through which CE 208 intends to communicate, and other devices that provide traffic to CE1 for forwarding through the provide network.

Routing functionality 232 is included in CE 208. Routing functionality 232 enables CE 208 to route traffic to PEs (not shown) and/or to other devices with which CE 208 is in communication. Additional functionality 234 enables a CsC architecture to be deployed substantially without the establishment of CE-to-CE BGP sessions or, in one embodiment, without the use of route reflectors (not shown).

CE 208 also includes support functionality 236 that allows CE 208 to at least establish, join, maintain, and/or terminate a VPN. Support functionality 236 generally includes functionality that allows for the addition of an originator_ID attribute such that CE-to-CE BGP sessions may substantially be eliminated. In one embodiment, support functionality 236 includes BGP speaker logic 238, creating logic 240, and advertising logic 244. BGP speaker logic 238 is arranged to pass a path advertisement from CE 208 to a PE (not shown). Creating logic 240 is suitable for establishing and/or maintaining a VPN. Advertising logic 244 is arranged to create an advertisement which includes information to be passed to a PE (not shown) using BGP. It should be appreciated that advertising logic 244 may create an advertisement that includes an indication that a next-hop is to be specified as CE 208, as well as an originator_ID attribute which identifies CE 208. The originator_ID attribute may identify a loopback address for CE 208, or an IP address for CE 208 that is to be used for BGP peering.

Figure 2B:
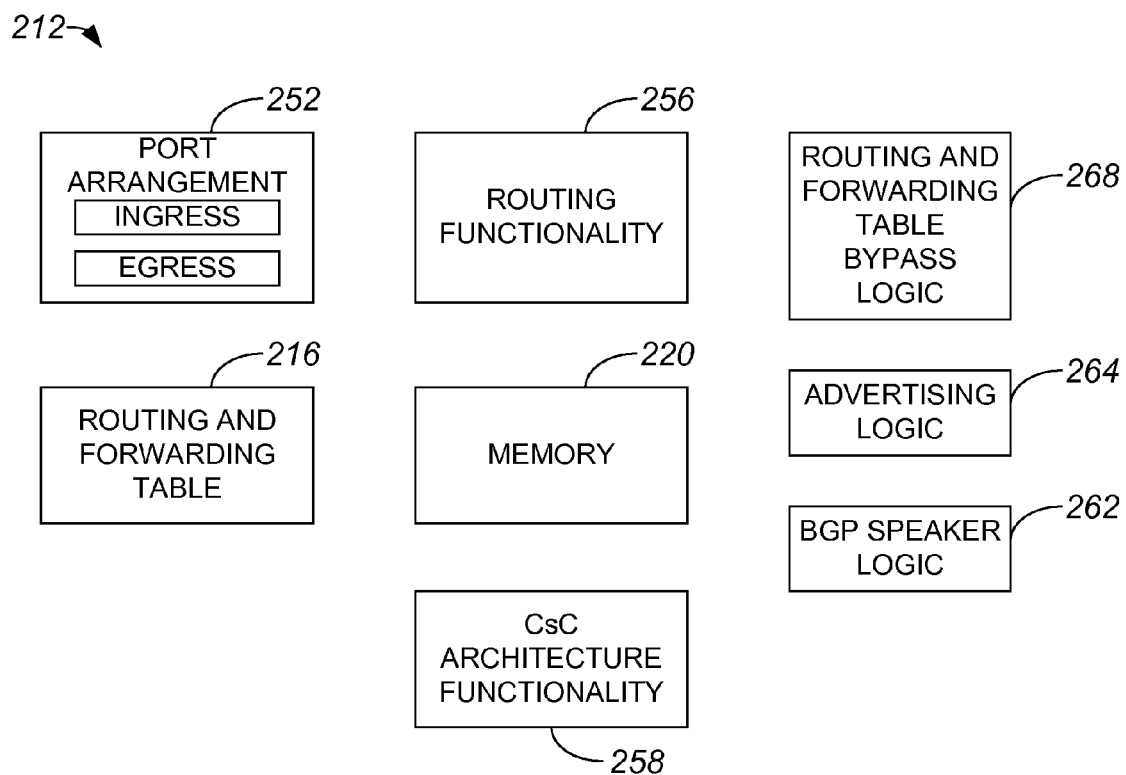
FIG. 2B is a block diagram representation of a PE in accordance with an embodiment of the present invention.

FIG. 2B is a block diagram representation of a suitable PE device in accordance with an embodiment of the present invention. A PE 212 is generally arranged to receive advertisements from a CE (not shown), and to provide advertisements to other PEs (not shown) and/or CEs (not shown). A port arrangement 252 that provides egress and ingress capabilities that allows PE 212 to maintain connections within an associated provider network, and with at least one CE (not shown). Advertisements may be obtained through, and provided through, port arrangement 252.

PE 212 also includes routing functionality 256 that enables PE 212 to route traffic, e.g., packets, to other devices. In one embodiment, routing functionality 256 is configured to enable PE 212 to effectively function as a relay. CsC architecture functionality 258, enables a CsC architecture to be substantially supported.

Also included in PE 212 are BGP speaker logic 262, advertising logic 264, and forwarding table bypass logic 268. BGP speaker logic 238 is arranged to pass a path advertisement to other PEs and/or CEs (not shown). BGP speaker logic 238 is further arranged to obtain reachable local routes in an advertisement from a CE (not shown), but to refrain from install the reachable local routes into a routing and/or forwarding table 216. In one embodiment, routing and/or forwarding table 216 is a VRF. BGP speaker logic 238 may be configured to install substantially only the real next-hop of the reachable local routes into table 216.

A memory 220 may be used by BGP speaker logic 238 to store information pertaining to the reachable local routes. That is, rather than store information pertaining to reachable local routes in table 216, such information may be stored in memory 220.

In cooperation with advertising logic 264, which is arranged to provide advertisements to other PEs (not shown) and/or CEs (not shown), BGP speaker logic 262 supports the advertisements of routes which have not be stored into table 216. Such advertisements may advertise uninstalled routes after BGP speaker logic 262 confirms that an associated original next-hop is available and installed in table 216. BGP speaker logic 238 in conjunction with advertising logic 264 may also have the ability to cause originator next-hop prefixes to be advertised with their associated labels.

Routing and forwarding table bypass logic 268 provides an indication in an advertisement which indicates that any subsequent PE (not shown) which receives or otherwise obtains an advertisement from PE 212 should refrain from adding reachable local paths identified in the advertisement to a local forwarding table of the subsequent PEs. Forwarding table bypass logic 268 is further arranged to inform a recipient of an advertisement that the originator next-hop prefix included in the advertisement is to remain substantially static, e.g., is not to be changed.

Figure 3A:
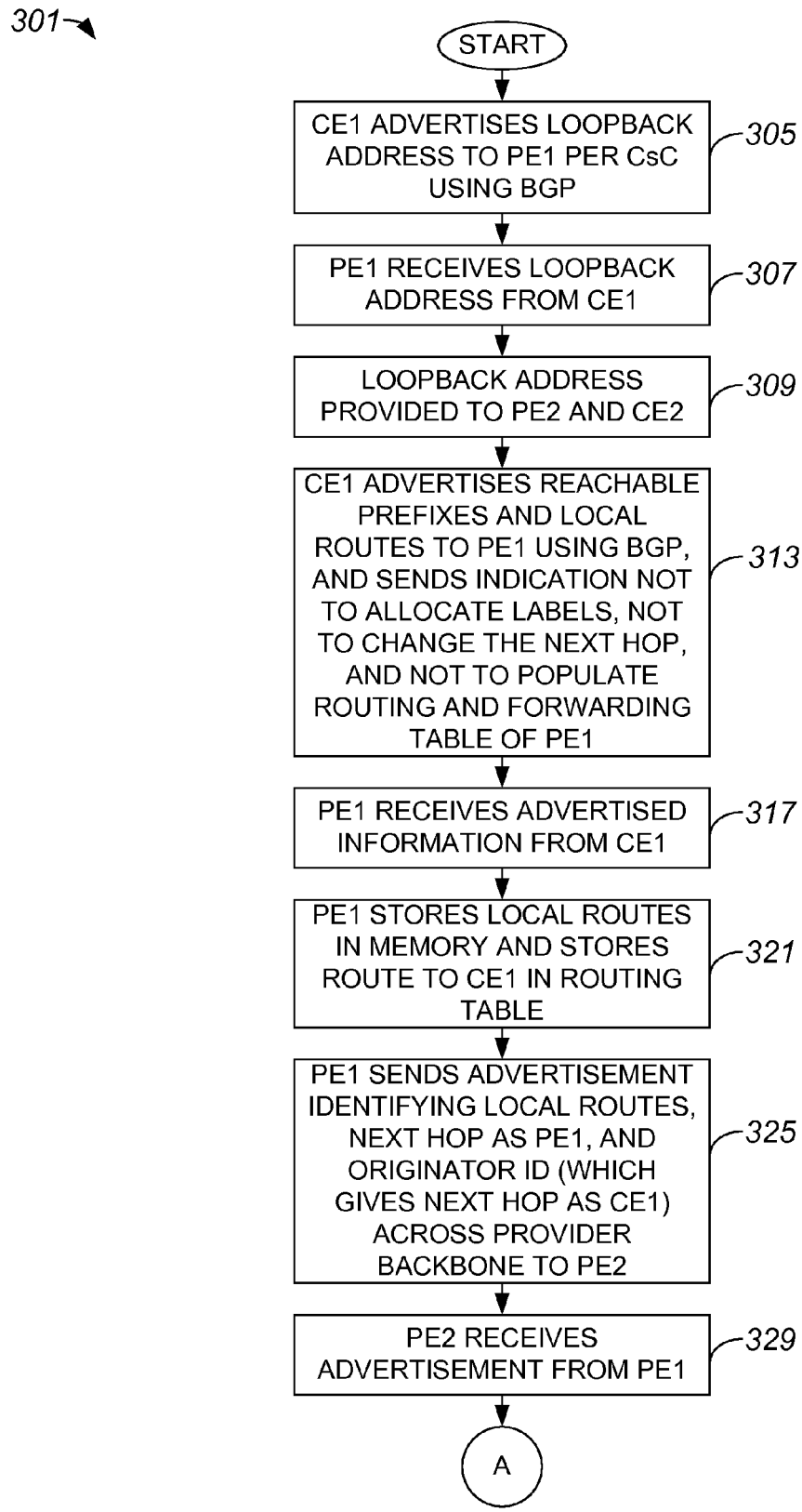
FIGS. 3A and 3B are a process flow diagram which illustrates a method of communicating between CEs via PEs of a provider network in accordance with an embodiment of the present invention.
Figure 3B:
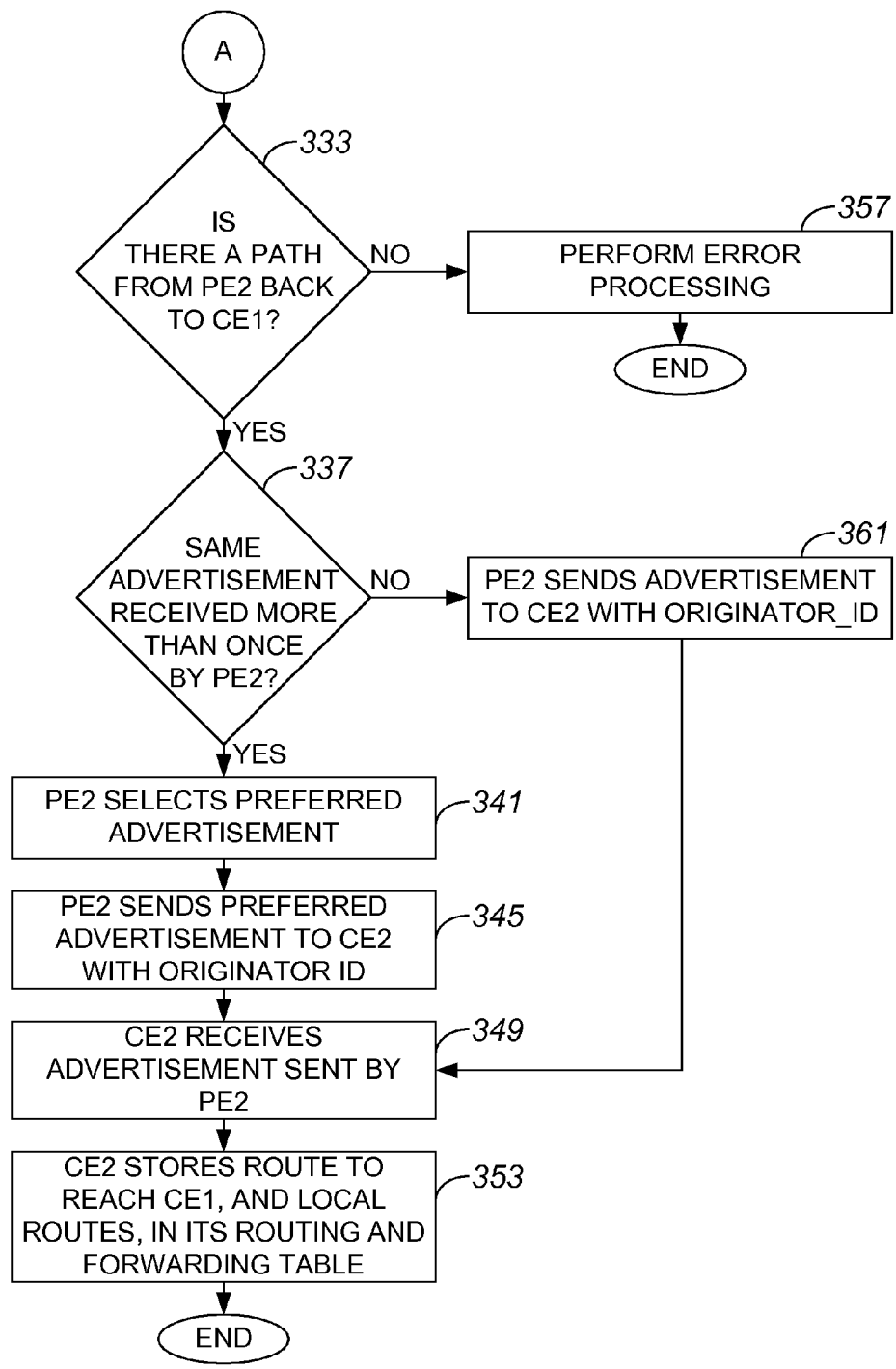

With reference to FIGS. 3A and 3B, a method of communicating between CEs via PEs of a provider network will be described in accordance with an embodiment of the present invention. A method 301 of indirectly exchanging routes between CEs in a CsC environment begins at step 305 in which a first CE, or CE1, of a first customer advertises its loopback address to a first PE, or PE1, that is associated with a provider network. With respect to CE1, PE1 is effectively a local PE router. A loopback address, or an IP address that is typically used for BGP peering, is advertised by CE1 such that PE1 may install a prefix associated with the loopback address into a VRF associated with PE1. As will be appreciated by those skilled in the art, the prefix associated with the loopback address may be the IP address of CE1.

After CE1 advertises its loopback address to PE1, PE1 receives or otherwise obtains the loopback address in step 307. Then, in step 309, the loopback address of CE1 is provided to a second PE, or PE2, of the provider network and a second CE, or CE2, or a second customer. In one embodiment, CE1 advertises its loopback address, along with an associated label, to remote CEs such as CE2. Such an advertisement of loopback addresses is performed consistently with a CsC architecture. PE2 may receive the loopback address via PE1.

In step 313, CE1 advertises substantially all reachable local routes associated with CE1 and the VPN of which CE1 is a part. That is, CE1 advertises reachable prefixes and local routes of the first customer to PE1 using BGP. CE1 also sends an indication that labels are not to be allocated to the local routes by PE1, an indication that the specified CE next-hop is not to be changed within the provider network, and an indication that PE1 is not to install the reachable local routes into a local VRF. The CE next-hop is, in one embodiment, specified as CE1. As such, the indication that the specified CE next-hop is not to be changed effectively results in CE1 being maintained as the specified CE next-hop throughout the core of the provider network.

An advertisement that is sent by CE1 may be sent between CE1 and PE1 using BGP. More generally, CE1 may advertise to PE1 on an existing control plane path. After the CE1 advertises reachable prefixes and local routes, and sends indications to PE1, e.g., in an advertisement, PE1 receives or otherwise obtains the advertised information from CE1 in step 317. Upon receiving the advertisement, PE1 may store the reachable local routes in memory in step 321. That is, in lieu of storing the reachable local routes in a VRF, PE1 may store the reachable local routes in a local memory. It should be appreciated, however, that PE1 may not necessarily store the reachable local routes in a local memory. Although PE1 does not store information regarding the reachable local routes in the VRF, PE1 generally stores information in the VRF regarding a route between PE1 and CE1.

Once PE1 stores reachable local routes in a memory, and not in a VRF, PE1 sends an advertisement to PE2 in step 325. The advertisement sent by PE1 to PE2 is sent across a backbone of the provider network, and includes an identification of the reachable local routes associated with CE1, as well as an identification of CE1 as a next hop. In the described embodiment, the advertisement is a newly created advertisement. The advertisement also includes a marking or indicator that effectively provides the address of CE1. In one embodiment, such a marking is essentially encoded as an originator_ID attribute, although such a marking is not limited to being encoded as an originator_ID attribute. As will be appreciated by those skilled in the art, an originator_ID attribute generally carries a BGP identifier of the originator of a route, e.g., a BGP identifier for CE1.

From step 325, process flow proceeds to step 329 in which PE2 receives or otherwise obtains the advertisement sent by PE1. The advertisement may, in one embodiment, identify the next hop for routes sent by PE1 as PE1, and an originator_ID which identifies CE1. In accordance with the indications included in the advertisement sent by PE1, PE2 does not install information which identifies reachable local routes associated with CE1 into a VRF of PE2. However, PE2 may store information which identifies reachable local routes in a memory associated with PE2.

After PE2 obtains the advertisement, PE2 determines whether there is a path from PE2 back to CE1 in step 333. Such a determination may include comparing a loopback address for CE1 to the originator_ID included in the advertisement. If the determination in step 325 is that there is no path from PE2 back to CE1, then in step 357, error processing is performed. Error processing may include providing a network administrator of provider network with an indication that there is a fault or inconsistency associated with the provider network that results in a lack of a path from PE2 back to CE1. Once error processing is performed, the process of indirectly exchanging routes is completed.

Alternatively, if it is determined in step 333 that there is a path from PE2 back to CE1, then a determination is made in step 337 as to whether PE2 has effectively received the same advertisement more than once. In a system with multi-homed CEs, a receiving PE such as PE2 may receive multiple routes to a given prefix. That is, PE2 may receive substantially the same route from multiple PEs. Hence, PE2 is arranged to select a preferred route from among multiple routes. Upon receiving multiple routes to a given prefix, PE2 may apply a BGP selection algorithm to select a preferred route from among the multiple routes between PE2 and other PEs in a provider network.

If it is determined in step 337 that the same advertisement has not been received more than once by PE2, PE2 effectively readvertises the information received by PE2 to CE2 in step 361. The "readvertisement" sent by PE2 includes the originator_ID included in the advertisement received by PE2. The originator_ID generally gives an address of CE1. From step 361, process flow moves to step 349 in which CE2 receives the advertisement sent by PE2. Upon receiving the advertisement, CE2 stores information regarding how to reach CE1, as well as information regarding reachable local routes associated with CE1, into its routing table, and the process of indirectly exchanging routes is completed.

Returning to step 337, if it is determined that the same advertisement has been received more than once by PE2, PE2 selects a preferred advertisement in step 341. That is, PE2 selects an exit point PE with which to reach routes advertised by CE1, as will be appreciated by those skilled in the art. Once the preferred advertisement is selected, PE2 readvertises the preferred advertisement to CE2 in step 345. Readvertising the preferred advertisement includes providing the originator_ID contained in the preferred advertisement to CE2.

After PE2 effectively sends the preferred advertisement to CE2, CE2 receives the preferred advertisement in step 349. CE2 then stores information regarding how to reach CE1, and information regarding reachable local routes associated with CE1, into its routing and forwarding table in step 353, and the process of indirectly exchanging routes is completed.

Although only a few embodiments of the present invention have been described, it should be understood that the present invention may be embodied in many other specific forms without departing from the spirit or the scope of the present invention. By way of example, a service provider network may include multiple route reflectors. Such route reflectors may be arranged to obtain and to forward a received advertisement substantially without modifying the received advertisement. In one embodiment, a route reflector is arranged not to change next hop information and not to change information associated with an originator_ID attribute.

While an originator_ID attribute has been described as being suitable to associate prefixes with a first CE of an original path, the association of prefixes with the first CE is not limited to being effectuated using an originator_ID attribute. That is, the address of the first CE is not limited to being specified in an originator_ID attribute. For instance, a new attribute may be defined to convey an address of the first CE. If a new attribute is defined, each CE and PE which is likely to obtain, originate, or otherwise use the new attribute is configured to recognize the new attribute.

The steps associated with the methods of the present invention may vary widely. Steps may be added, removed, altered, combined, and reordered without departing from the spirit of the scope of the present invention. By way of example, when a PE forwards an advertisement substantially directly to a CE, that advertisement may generally be forwarded or otherwise sent to any number of CEs. Therefore, the present examples are to be considered as illustrative and not restrictive, and the invention is not to be limited to the details given herein, but may be modified within the scope of the appended claims.

What is claimed is:

1. A method comprising:
    obtaining a first advertisement from a first customer edge (CE) device at a first provider edge (PE) device, the first CE device being associated with a first virtual private network (VPN), the first PE device having a routing and forwarding table, the first advertisement being arranged to identify a plurality of local routes associated with the first VPN, the first advertisement further including a first indication that information relating to the plurality of local routes is not to be stored in the routing and forwarding table; and
    sending a second advertisement from the first PE device on a control plane path associated with a border gateway protocol (BGP) after obtaining the first advertisement, the second advertisement being arranged to identify the plurality of local routes and an address of the first CE device, the second advertisement further being arranged to specify the first CE device as a next hop.

2. The method of claim 1 wherein sending the second advertisement includes sending the second advertisement to a second PE device, wherein the first PE device and the second PE device are associated with a provider network.

3. The method of claim 2 wherein sending the second advertisement to the second PE device includes sending the second advertisement across a backbone of the provider network.

4. The method of claim 1 further including:
    obtaining a loopback address associated with the first CE device; and
    providing the loopback address to a second PE device, wherein the second PE device is configured to provide the loopback address to a second CE device.

5. The method of claim 1 further including:
    storing the information relating to the plurality of local routes in a memory associated with the first PE device.

6. The method of claim 1 further including:
    storing a second indication that identifies a first route, the second indication being stored in the routing and forwarding table, the first route being arranged between the first CE and the first PE.

7. A method comprising:
    obtaining a first advertisement from a first customer edge (CE) device at a first provider edge (PE) device, the first CE device being associated with a first virtual private network (VPN), the first PE device having a routing and forwarding table, the first advertisement being arranged to identify a plurality of local routes associated with the first VPN, the first advertisement further including a first indication that information relating to the plurality of local routes is not to be stored in the routing and forwarding table; and
    sending a second advertisement on a control plane path associated with a border gateway protocol (BGP) after obtaining the first advertisement, the second advertisement being arranged to identify the plurality of local routes and an address of the first CE device, the second advertisement further being arranged to specify the first CE device as a next hop wherein the first advertisement further includes a second indication that a second PE device is not to allocate labels and a third indication that the next hop in the second advertisement is to identify the first CE device.

8. The method of claim 1 further including:
establishing a label switched path (LSP) between the first CE device and a second CE device, the LSP being arranged to pass through a provider network that includes the first PE device.

9. The method of claim 8 wherein establishing the LSP between the first CE device and the second CE device includes establishing the LSP using a Carrier's Carrier (CsC) architecture.

10. Logic encoded in one or more tangible, non-transitory computer-readable media for execution and when executed operable to:
obtain a first advertisement from a first customer edge (CE) device at a first provider edge (PE) device, the first CE device being associated with a first virtual private network (VPN), the first PE device having a routing and forwarding table, the first advertisement being arranged to identify a plurality of local routes associated with the first VPN, the first advertisement further including a first indication that information relating to the plurality of local routes is not to be stored in the routing and forwarding table; and
send a second advertisement from the first PE device on a control plane path associated with a border gateway protocol (BGP) after obtaining the first advertisement, the second advertisement being arranged to identify the plurality of local routes and an address of the first CE device, the second advertisement further being arranged to specify the first CE device as a next hop.

11. The logic of claim 10 wherein the logic operable to send the second advertisement is further operable to send the second advertisement to a second PE device, wherein the first PE device and the second PE device are associated with a provider network.

12. The logic of claim 10 further operable to:
obtain a loopback address associated with the first CE; and
provide the loopback address to a second PE device, wherein the second PE device is configured to provide the loopback address to a second CE device.

13. The logic of claim 10 further operable to:
store the information relating to the plurality of local routes in a memory associated with the first PE device.

14. Logic encoded in one or more tangible, non-transitory computer-readable media for execution and when executed operable to:
obtain a first advertisement from a first customer edge (CE) device at a first provider edge (PE) device, the first CE device being associated with a first virtual private network (VPN), the first PE device having a routing and forwarding table, the first advertisement being arranged to identify a plurality of local routes associated with the first VPN, the first advertisement further including a first indication that information relating to the plurality of local routes is not to be stored in the routing and forwarding table; and
send a second advertisement on a control plane path associated with a border gateway protocol (BGP) after obtaining the first advertisement, the second advertisement being arranged to identify the plurality of local routes and an address of the first CE device, the second advertisement further being arranged to specify the first CE device as a next hop, wherein the first advertisement further includes a second indication that a second PE device is not to allocate labels and a third indication that the next hop in the second advertisement is to identify the first CE device.

15. The logic of claim 10 further operable to:
establish a label switched path (LSP) between the first CE device and a second CE device, the LSP being arranged to pass through a provider network that includes the first PE device.

16. The logic of claim 15 wherein the logic operable to establish the LSP between the first CE device and the second CE device is further operable to establish the LSP using a Carrier's Carrier (CsC) architecture.

17. An apparatus comprising:
means for obtaining a first advertisement from a first customer edge (CE) device at a first provider edge (PE) device, the first CE device being associated with a first virtual private network (VPN), the first PE device having a routing and forwarding table, the first advertisement being arranged to identify a plurality of local routes associated with the first VPN, the first advertisement further including a first indication that information relating to the plurality of local routes is not to be stored in the routing and forwarding table; and
means for sending a second advertisement from the first PE device on a control plane path associated with a border gateway protocol (BGP) after obtaining the first advertisement, the second advertisement being arranged to identify the plurality of local routes and an address of the first CE device, the second advertisement further being arranged to specify the first CE device as a next hop.

18. An apparatus comprising:
at least one tangible, non-transitory medium;
a first virtual routing and forwarding table (VRF); a first logic, the first logic being embodied on the at least one tangible medium, the first logic being configured to obtain a plurality of customer routes from a customer edge (CE), the first logic further being configured not to install the plurality of customer routes in the first VRF, wherein the apparatus and the CE are arranged to be in communication over a border gateway protocol (BGP) session associated with a Carrier's Carrier (CsC) architecture; and
a second logic, the second logic being embodied on the at least one tangible medium, the second logic being arranged to identify the CE, the second logic further being arranged to propagate a first advertisement to a recipient, the first advertisement being arranged to include information pertaining to the plurality of customer routes, an indication that the plurality of customer routes are not to be stored in a second VRF of the recipient, and an indication that a next-hop is the CE.

19. The apparatus of claim 18 wherein the first advertisement further includes an originator_ID attribute, the originator_ID attribute being arranged to identify the CE.

20. An apparatus comprising:
at least one tangible, non-transitory medium;
a first virtual routing and forwarding table (VRF);
a first logic, the first logic being embodied on the at least one tangible medium, the first logic being configured to obtain a plurality of customer routes from a customer edge (CE), the first logic further being configured not to install the plurality of customer routes in the first VRF, wherein the apparatus and the CE are arranged to be in communication over a border gateway protocol (BGP) session associated with a Carrier's Carrier (CsC) architecture; and a memory, wherein the first logic is configured to store information relating to the plurality of customer routers in the memory, wherein the information is obtained in an advertisement from the customer edge, the advertisement further including a first indication that the plurality of customer routes are not to be stored in the VRF.

21. An apparatus comprising:

at least one tangible, non-transitory medium;

a first virtual routing and forwarding table (VRF); a first logic, the first logic being embodied on the at least one tangible medium, the first logic being configured to obtain a plurality of customer routes from a customer edge (CE), the first logic further being configured not to install the plurality of customer routes in the first VRF, wherein the apparatus and the CE are arranged to be in communication over a border gateway protocol (BGP) session associated with a Carrier's Carrier (CsC) architecture; and a port, the port being arranged to receive an advertisement from the customer edge, wherein the advertisement includes the plurality of customer routes and a first indication that the plurality of customer routes are not to be stored in the first VRF.

22. An apparatus comprising:

a first virtual routing and forwarding table (VRF);

a first arrangement, the first arrangement being configured to obtain a plurality of customer routes from a customer edge (CE), the first arrangement further being configured not to install the plurality of customer routes in the first VRF, wherein the apparatus and the CE are arranged to be in communication over a border gateway protocol (BGP) session associated with a Carrier's Carrier (CsC) architecture; and a port arrangement, the port arrangement including at least an ingress port, the port arrangement being arranged to receive an advertisement on the ingress port from the customer edge, wherein the advertisement includes the plurality of customer routes and a first indication that the plurality of customer routes are not to be stored in the first VRF, and wherein the advertisement further includes a second indication, the second indication being arranged to indicate that a next-hop is not to be changed.

23. The apparatus of claim 21 wherein the first logic is configured to obtain the first indication and to use the first indication, to determine not to install the plurality of customer routes in the first VRF.

* * * * *